(12) United States Patent
Suzuki et al.

(10) Patent No.: US 9,015,369 B2
(45) Date of Patent: Apr. 21, 2015

(54) DATA TRANSFERRING APPARATUS AND DATA TRANSFERRING METHOD

(71) Applicant: Fujitsu Limited, Kawasaki (JP)

(72) Inventors: Takahisa Suzuki, Kawasaki (JP);
Koichiro Yamashita, Hachioji (JP);
Hiromasa Yamauchi, Kawasaki (JP);
Koji Kurihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 102 days.

(21) Appl. No.: 13/624,337

(22) Filed: Sep. 21, 2012

(65) Prior Publication Data
US 2013/0060974 A1 Mar. 7, 2013

Related U.S. Application Data

(63) Continuation of application No. PCT/JP2010/055137, filed on Mar. 24, 2010.

(51) Int. Cl.
*G06F 13/28* (2006.01)
*G06F 13/00* (2006.01)

(52) U.S. Cl.
CPC ...................................... *G06F 13/28* (2013.01)

(58) Field of Classification Search
CPC ..... G06F 13/28; G06F 3/061; G06F 12/0866;
G06F 12/0879; G06F 13/00
See application file for complete search history.

(56) References Cited

U.S. PATENT DOCUMENTS

| | | | |
|---|---|---|---|
| 5,928,327 A | 7/1999 | Wang et al. | |
| 6,185,637 B1 * | 2/2001 | Strongin et al. | 710/35 |
| 6,212,657 B1 | 4/2001 | Wang et al. | |
| 6,247,161 B1 * | 6/2001 | Lambrecht et al. | 716/138 |
| 6,393,500 B1 | 5/2002 | Thekkath | |
| 6,473,814 B1 * | 10/2002 | Lyons et al. | 710/35 |
| 2008/0235423 A1 | 9/2008 | Mace | |

(Continued)

FOREIGN PATENT DOCUMENTS

| | | |
|---|---|---|
| CN | 101271438 A | 9/2008 |
| JP | 5-134977 | 6/1993 |
| JP | 6-274446 | 9/1994 |
| JP | 10-93924 | 4/1998 |
| JP | 2003-114866 | 4/2003 |
| JP | 2006-209500 | 8/2006 |

(Continued)

OTHER PUBLICATIONS

International Preliminary Report on Patentability and Written Opinion for PCT/JP2010/055137, 11 pages.

(Continued)

*Primary Examiner* — Idriss N Alrobaye
*Assistant Examiner* — Ronald Modo
(74) *Attorney, Agent, or Firm* — Staas & Halsey LLP

(57) ABSTRACT

A memory stores data generated by a processor and a transferring unit burst transfers the data from the memory unit to a processing unit. Based on an access capability of the processor when accessing the memory, a prescribed value for a burst width and information concerning the time that the processing unit consumes to process the data are set in advance at the data transferring apparatus. When the transferring unit performs data transfer, the time allowed for data transfer is calculated based on the information concerning the time that the processing unit consumes to process the data, and the burst width is determined as a value greater than or equal to the prescribed value for the burst width and is as close as possible to the prescribed value for the burst width within a range in which data transfer can be finished within the allowed time.

12 Claims, 18 Drawing Sheets

(56) References Cited

U.S. PATENT DOCUMENTS

2008/0270643 A1 10/2008 Tashiro
2010/0325319 A1* 12/2010 Worrell et al. .................. 710/35

FOREIGN PATENT DOCUMENTS

| | | |
|---|---|---|
| JP | 2007-304908 | 11/2007 |
| JP | 2008-3925 | 1/2008 |
| JP | 2008-234659 | 10/2008 |
| JP | 2008-269467 | 11/2008 |

OTHER PUBLICATIONS

Extended European Search Report mailed Oct. 30, 2013 in corresponding European Application No. 10848379.3.
International Search Report of Corresponding PCT Application PCT/JP2010/055137 mailed Jul. 6, 2010.
Japanese Office Action mailed Mar. 4, 2014 in corresponding Japanese Application No. 2012-506708.
Chinese Office Action issued Aug. 20, 2014 in corresponding Chinese Patent Application No. 201080065625.6.

* cited by examiner

FIG.4

```
burst_widths[] = {1, 2, 4, 8, 16}; // SELECTABLE BURST WIDTH for(i = 0; i < 5; i++) {
 START TIME MEASUREMENT;
 START DATA TRANSFERRING UNIT (burst_width[i]); // SPECIFY BURST
WIDTH AND START DATA TRANSFERRING UNIT
 for(j = 0; j < 10000; j++) {
  A[j] = B[j]; // DATA TRANSFER BY PROCESSOR
 }
 SUSPEND DATA TRANSFERRING UNIT;
 END TIME MEASUREMENT;
 ACQUIRE VOLUME OF DATA TRANSFERRED BY DATA
TRANSFERRING UNIT; // ACQUIRE VOLUME OF DATA TRANSFERRED
BY DATA TRANSFERRING UNIT BEFORE SUSPENSION
 RECORD BURST WIDTH, MEASUREMENT TIME, AND VOLUME OF
DATA TRANSFERRED BY DATA TRANSFERRING UNIT;
}
```

FIG.5

| BURST WIDTH | MEASUREMENT TIME (ms) | DATA TRANSFER VOLUME (MB) |
|---|---|---|
| 1 | 842 | 583 |
| 2 | 1051 | 814 |
| 4 | 1713 | 1389 |
| ... | ... | ... |

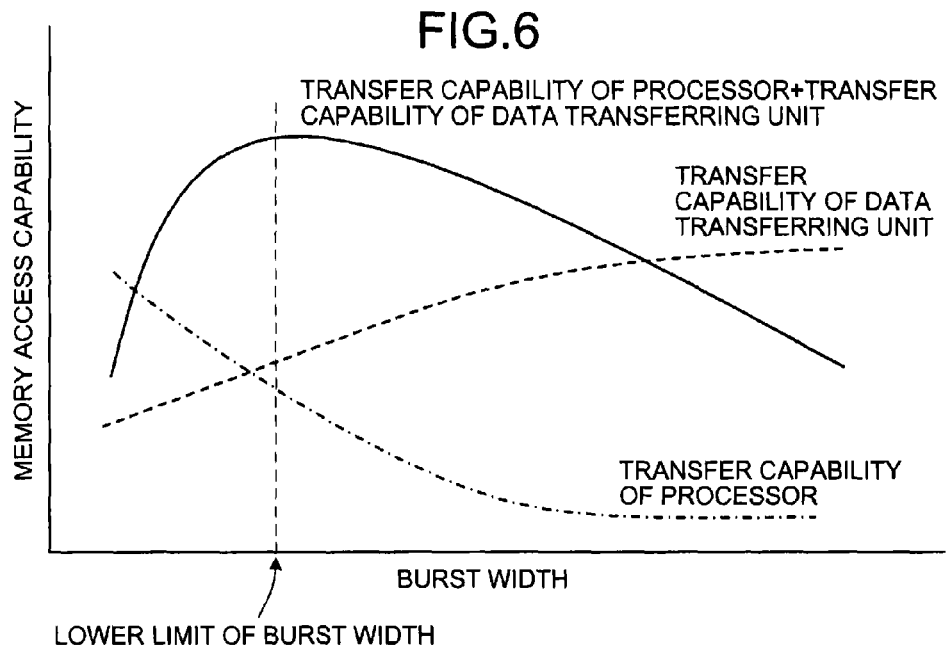
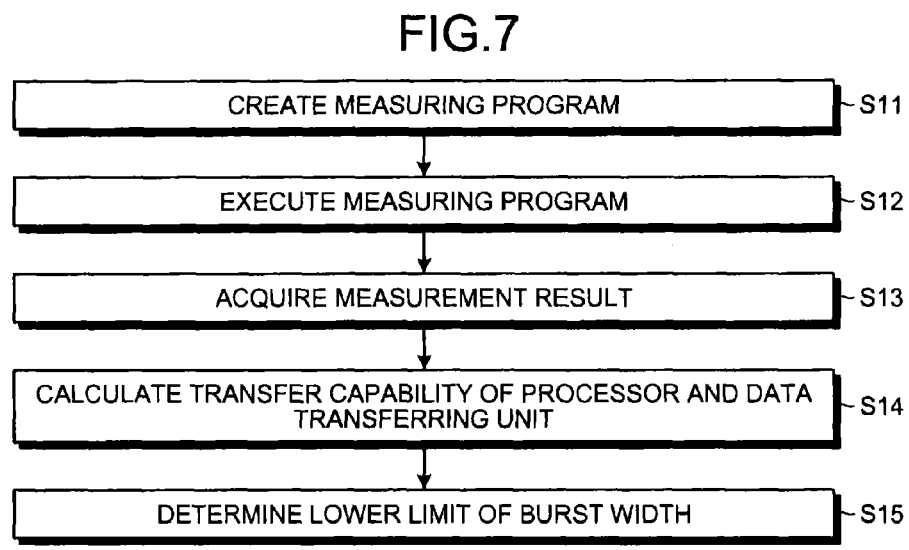

```
START TIME MEASUREMENT;
START GRAPHIC PROCESS (SIZE 1, MODE 1);
AWAIT END OF GRAPHIC PROCESS;
END TIME MEASUREMENT;
RECORD GRAPHIC PARAMETERS (SIZE, MODE) AND MEASUREMENT
TIME;

START TIME MEASUREMENT;
START GRAPHIC PROCESS (SIZE 2, MODE 1);
AWAIT END OF GRAPHIC PROCESS;
END TIME MEASUREMENT;
RECORD GRAPHIC PARAMETERS AND MEASUREMENT TIME;

...
```

| SCREEN SIZE | GRAPHIC MODE | PROCESS TIME (ms) |
|---|---|---|
| 320×240 | 2D | 1 |
| 640×480 | 2D | 8 |
| 1024×768 | 2D | 16 |
| ... | ... | ... |

24

CREATE MEASURING PROGRAM — S21
EXECUTE MEASURING PROGRAM — S22
ACQUIRE MEASUREMENT RESULT — S23

FIG.22

| BURST WIDTH | TRANSFER INTERVAL | TRANSFER SIZE (KB) | TRANSFER TIME (ms) |
|---|---|---|---|
| 4 | 10 | 921 | 9.2 |
| 4 | 15 | 921 | 8.5 |
| 8 | 30 | 921 | 7.5 |
| ... | ... | ... | ... |

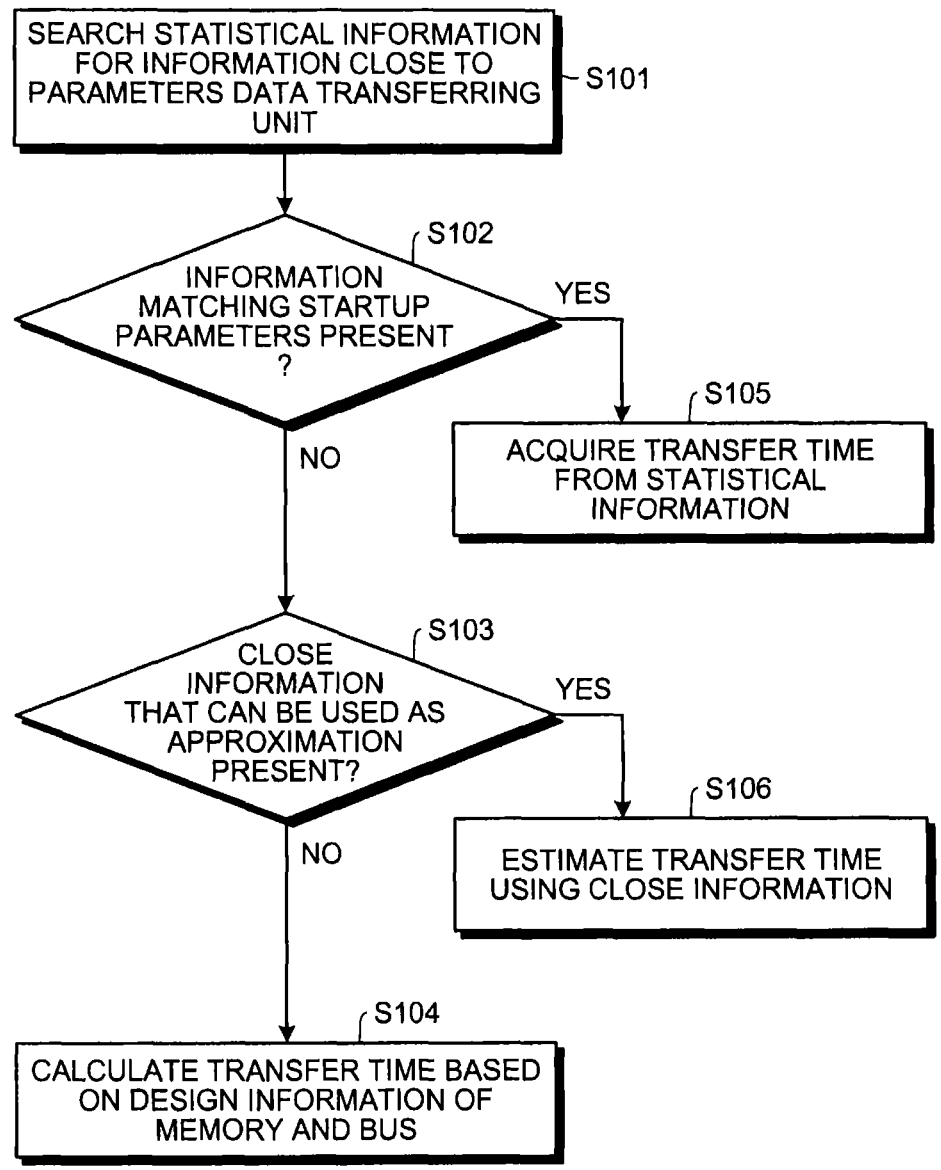

DATA TRANSFERRING APPARATUS AND DATA TRANSFERRING METHOD

CROSS REFERENCE TO RELATED APPLICATIONS

This application is a continuation application of International Application PCT/JP2010/055137, filed on Mar. 24, 2010 and designating the U.S., the entire contents of which are incorporated herein by reference.

FIELD

The embodiments discussed herein are related to a data transferring apparatus and a data transferring method.

BACKGROUND

Burst transfer is a conventional technique for enabling a data processing apparatus to transfer data at high speed. Among burst transfer techniques, one technique is known that when a request for a transfer of different data having a high priority level is created during data transfer, the burst width of the data under transfer is set to a width that allows the data to be transferred before the start of transfer of the different data having the high priority level. Another technique is also known that when multiple data are transferred by time-shared parallel processing, the time within which transfer of data should be completed and a time expected to be consumed for transferring the data are calculated and based on the result of the calculation, the rate of time-sharing for data transfer is adjusted dynamically. For example, see Japanese Laid-Open Patent Publication Nos. 2007-304908 and 2006-209500.

According to the conventional burst transfer techniques, however, memory engaged in burst transfer cannot be accessed for purposes other than burst transfer. For this reason, if a processor tries to access the memory engaged in burst transfer, the processor has to stand by until the burst transfer ends. When the volume of data to be transferred is large, burst transfer to the memory is repeated. As a result, the stand-by time of the processor may get longer if the timing of the access is not good. This leads to a problem in that the effective capacity of the processor deteriorates.

If the burst width representing the size of data transferred in one burst transfer is reduced, the time required for one burst transfer becomes shorter. As burst transfer is repeated, therefore, the number of times that the memory returns to a state of being accessible for other purposes increases, thereby facilitating access by the processor. However, a smaller burst width leads to an increase in the number of times that burst transfer carried out until the completion of transfer of data to be transferred. This increase in the number of times of burst transfer results in an increase in delay times preceding data output from the memory and in the time required for precharge. Hence, the capability of processor to access the memory deteriorates.

If the interval between burst transfers is widened, the period in which the memory returns to a state of being accessible for other purposes increases between one burst transfer and the next burst transfer, thereby facilitating access of the memory by the processor. However, when the processor accesses the memory while the memory is engaged in burst transfer, the processor has to stand by until the burst transfer ends. Hence, the deterioration of effective capability of the processor cannot be prevented.

SUMMARY

According to an aspect of an embodiment, a data transferring apparatus includes a processor configured to generate data to be processed; a first memory unit that stores the data generated by the processor; a processing unit that processes the data generated by the processor; a transferring unit that burst transfers the data from the first memory unit to the processing unit; a second memory unit that stores information concerning time that the processing unit consumes to process the data; a third memory unit that stores a prescribed value for a burst width set based on an access capability of the processor when accessing the first memory unit; a calculating unit that calculates time that the transferring unit is allowed to consume for transfer of the data, based on the information that concerns the time that the processing unit consumes to process the data and is stored in the second memory unit; and a determining unit that based on an estimated time that the transferring unit is expected to consume for the transfer of the data, determines a burst width to be used for the transfer of the data by the transferring unit to be a value that is greater than or equal to the prescribed value for the burst width stored in the third memory unit and that is as close as possible to the prescribed value for the burst width, within a range in which the transfer of the data is finished within the time allowed for the transfer of the data calculated by the calculating unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 depicts one example of a program for measuring data transfer capability in the second embodiment;

FIG. 5 is a table depicting one example of a result of measurement of the data transfer capability in the second embodiment;

FIG. 6 is a graph depicting one example of a result of measurement of the data transfer capability in the second embodiment;

FIG. 7 is a flowchart of a method of determining the lower limit for the burst width in the second embodiment;

FIG. 22 is a table of an example of data transferring unit statistical information in the third embodiment; and FIG. 23 is a flowchart of a method of calculating the data transfer time according to the data transferring method of the third embodiment.

DESCRIPTION OF EMBODIMENTS

Embodiments of a data transferring apparatus and a data transferring method according to the present invention will be described in detail with reference to the drawings. The embodiments do not limit the present invention.

First Embodiment

A first embodiment is an embodiment according to which a burst width used at burst transfer of data is determined to be a value that is greater than or equal to a prescribed value for the burst width set in advance based on the access capability of a processor and that is as close as possible to the prescribed value for the burst width in a range in which data transfer is finished within an allowed time.

Description of Data Transferring Apparatus

Figure 1:
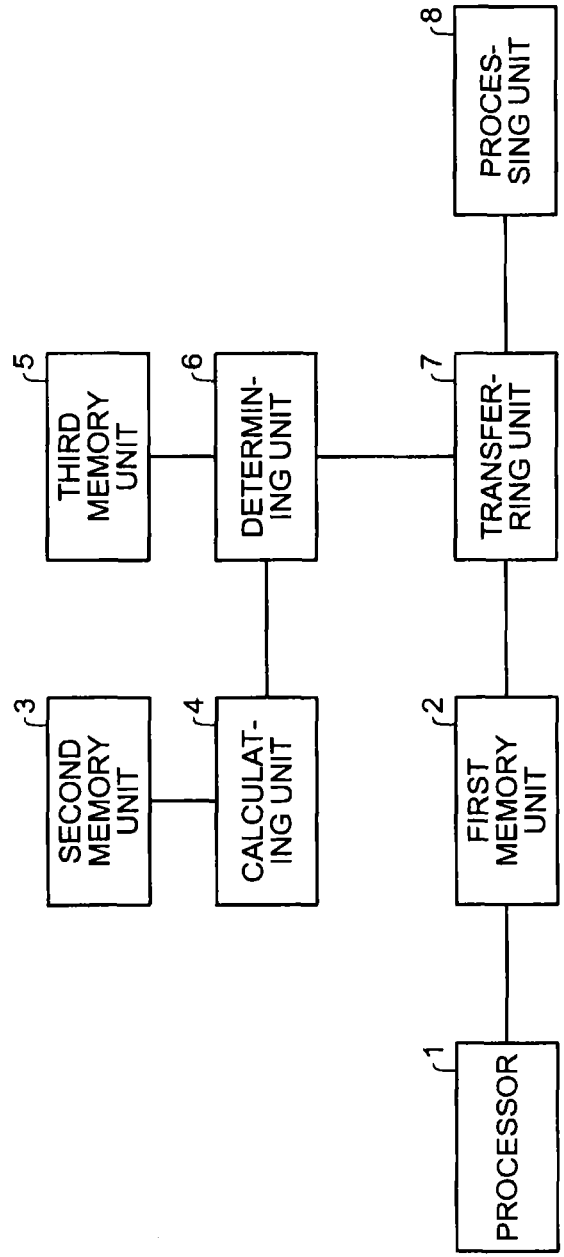
FIG. 1 is a block diagram of a data transferring apparatus of a first embodiment.

FIG. 1 is a block diagram of a data transferring apparatus according to the first embodiment. As depicted in FIG. 1, the data transferring apparatus includes a processor 1, a first memory unit 2, a second memory unit 3, a calculating unit 4, a third memory unit 5, a determining unit 6, a transferring unit 7, and a processing unit 8.

The processor 1 generates data to be processed. The first memory unit 2 stores therein data generated by the processor 1. The second memory unit 3 stores therein information concerning the time that the processing unit 8 consumes to carry out data processing. The information concerning the time that the processing unit 8 consumes to carry out data processing is set in advance. The calculating unit 4 calculates the time that the transferring unit 7 is allowed to consume for data transfer, based on the information concerning the time stored in the second memory unit 3. The third memory unit 5 stores therein a prescribed value for a burst width. The prescribed value for the burst width is set in advance based on the access capability of the processor 1 when accessing the first memory unit 2.

The determining unit 6 determines the burst width used for transfer of data by the transferring unit 7, based on the estimated time that the transferring unit 7 is expected to consume to transfer the data. The determining unit 6 determines the burst width to be a value that is greater than or equal to the prescribed value for the burst width stored in a third memory unit 5 and that is as close as possible to the prescribed value for the burst width in a range in which data transfer ends within the time allowed for data transfer calculated by the calculating unit 4. The transfer unit 7 burst transfers from the first memory unit 2 to the processing unit 8, data at the burst width determined by the determining unit 6. The processing unit 8 processes data generated by the processor 1.

Description of Data Transferring Method

Figure 2:
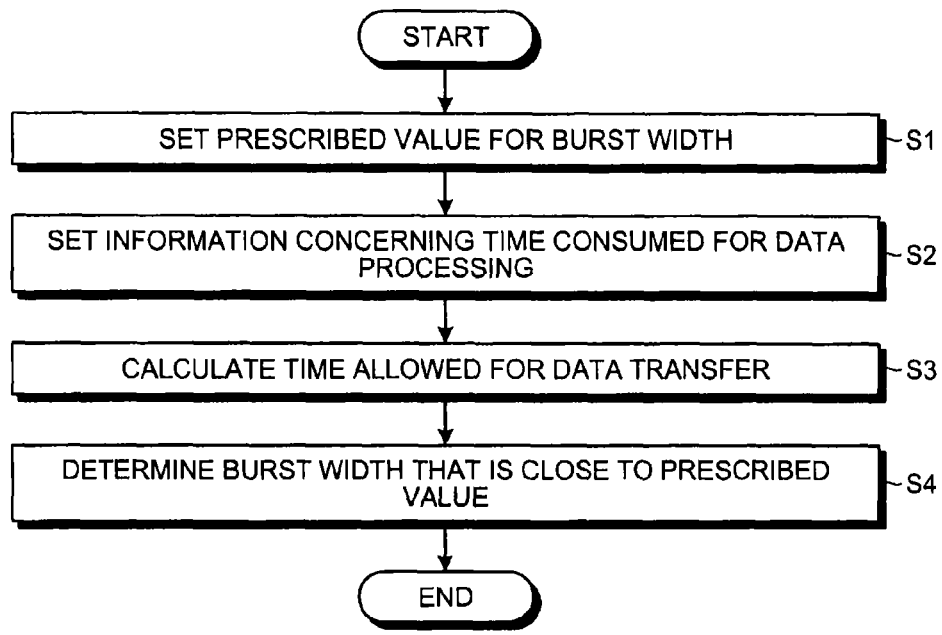
FIG. 2 is a flowchart of a data transferring method of the first embodiment.

FIG. 2 is a flowchart of a data transferring method according to the first embodiment. As depicted in FIG. 2, a prescribed value for a burst width used when the transferring unit 7 burst transfers data from the first memory unit 2 to the processing unit 8 is determined in advance, based on the access capability of the processor 1 when accessing the first memory unit 2. The prescribed value for the burst width is stored to the third memory unit 5 (step S1). Information concerning the time that the processing unit 8 consumes to carry out data processing is stored to the second memory unit 3 (step S2). Either of steps S1 and S2 may be executed first.

Data generated by the processor 1 is stored in the first memory unit 2. At the start of a process of burst transferring to the processing unit 8, data stored in the first memory unit 2, the calculating unit 4 calculates the time allowed for the data transfer, based on the information concerning the time consumed to carry out processing of the data stored in the second memory unit 3 (step S3).

Subsequently, the determining unit 6 determines the burst width to be used when the transferring unit 7 transfers data from the first memory unit 2 to the processing unit 8. The burst width is determined based on the estimated time that the transferring unit 7 is expected to consume to transfer the data. The burst width is determined to be a value that is greater than or equal to the prescribed value for the burst width stored in the third memory unit 5 and that is as close as possible to the prescribed value for the burst width in a range in which transfer of the data can be completed within the time allowed for data transfer calculated at step S3 (step S4). The transfer unit 7 transfers the data at the burst width determined at step S4, from the first memory unit 2 to the processing unit 8. The processing unit 8 processes the data, ending the series of steps.

According to the first embodiment, the burst width is determined to be a value that is greater than or equal to a prescribed value set based on the access capability of the processor 1 when accessing the first memory unit 2 and that is as close as possible to the prescribed value for the burst width. As the burst width becomes larger, data transfer capability by burst transfer becomes higher but the access capability of the processor 1 when accessing the first memory unit 2 becomes lower. When the burst width becomes smaller, the contrary outcome follows. Determining the burst width in the manner described in the first embodiment, therefore, puts the access capability of the processor 1 when accessing the first memory unit 2 in balance with the data transfer capability of the transferring unit 7. Hence, the deterioration of the effective capability of processor can be prevented.

Second Embodiment

In a second embodiment, the data transferring apparatus and the data transferring method of the first embodiment are applied to, for example, an apparatus and a method that carry out image processing. A method of determining a prescribed lower limit for the burst width will first be described. Then, a method of collecting information concerning the time that an image processing unit serving as the processing unit consumes to carrying out data processing will be described. Further, a configuration of a data transferring apparatus and a data transferring method according to the second embodiment will be described. In the second embodiment, multiple burst width sizes are prepared.

Description of Method of Determining Lower Limit of Burst Width

Figure 3:
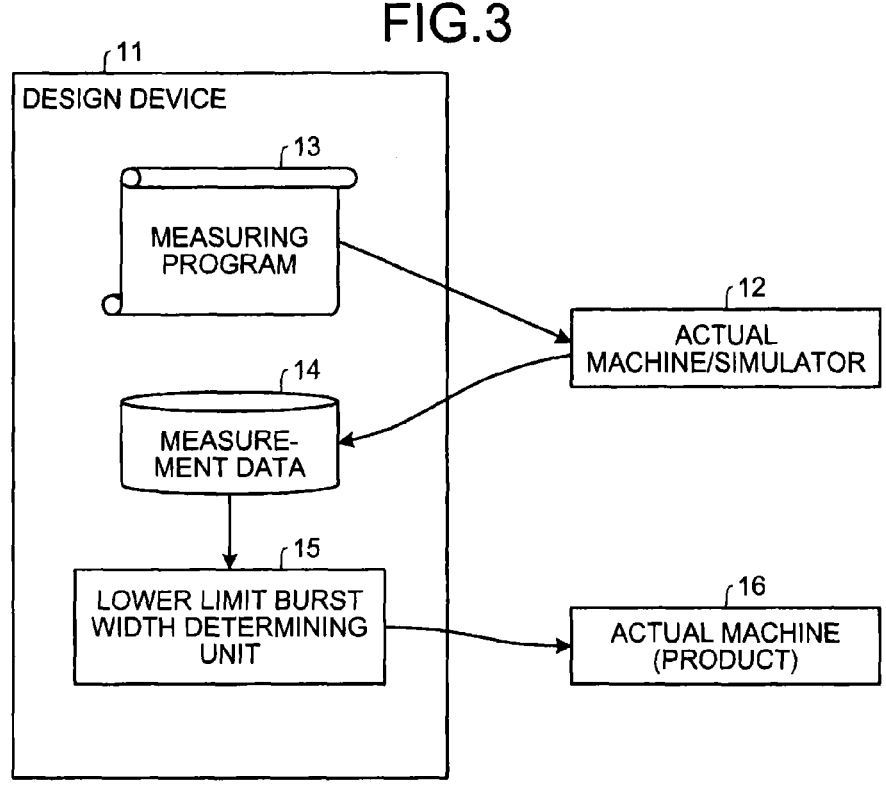
FIG. 3 is a block diagram of a configuration of a device in a second embodiment and that determines a lower limit for a burst width.

FIG. 3 is a block diagram of a configuration of a device that determines a lower limit for the burst width. FIG. 4 depicts one example of a program for measuring data transfer capability. FIG. 5 is a table depicting one example of a result of measurement of the data transfer capability. FIG. 6 is a graph depicting one example of a result of measurement of a data transfer capability.

As depicted in FIG. 3, a design device 11 and an actual machine (or simulator) 12 are prepared. When an actual machine is provided as the actual machine (or simulator) 12, the actual machine (or simulator) 12 includes a processor, memory serving as the first memory unit, a data transferring unit serving as the transferring unit, and an image processing unit serving as the processing unit (see FIG. 12). When a simulator is provided as the actual machine (or simulator) 12, the actual machine (or simulator) 12 has a configuration simulating a processor, memory serving as the first memory unit, a data transferring unit serving as the transferring unit, and an image processing unit serving as the processing unit.

A measuring program 13 is created by a designer using the design device 11. As depicted in FIG. 4, the measuring program 13 is created, for example, as a program that causes the processor to frequently access the memory while the data transferring unit burst transfers data at various burst widths, from the memory to the image processing unit in the actual machine (or simulator) 12. The actual machine (or simulator) 12 executes the measuring program 13 and returns to the design device 11, measurement data 14 acquired as a result of execution of the measuring program 13.

The measurement data 14 includes data indicative of the transfer capability of the processor and data indicative of the transfer capability of the transferring unit. For example, the transfer capability of the transferring unit may be evaluated in terms of the time that the data transferring unit has consumed to read an arbitrary volume of data out from the memory. For example, as depicted in FIG. 5, data indicating the time that the data transferring unit has consumed to read an arbitrary volume of data out from the memory is obtained for each burst width, as data indicative of the transfer capability of the transferring unit. For example, the transfer capability of the processor may be evaluated in terms of the time that the processor has consumed to read/write an arbitrary volume of data to/from the memory. For example, data indicating the time that the processor has consumed to read/write an arbitrary volume of data to/from the memory is obtained for each burst width, as data indicative of the transfer capability of the processor. In both cases, shorter times consumed to read/write or read out data mean better transfer capability.

The design device 11 has a lower limit burst width determining unit 15. Based on the measurement data 14, the lower limit burst width determining unit 15 determines the lower limit for a burst width according to, for example, a flowchart of FIG. 7. The lower limit burst width determining unit 15, for example, may calculate the transfer capability of the processor and the transfer capability of the data transferring unit for each burst width and calculate the sum of the capabilities. For example, as depicted in FIG. 6, in an environment where the processor frequently accesses the memory while the data transferring unit burst transfers data from the memory to the image processing unit, the transfer capability of the data transferring unit improves as the burst width increases. This happens for the following reason. When the burst width is large, the volume of data output from the memory by one burst transfer is large, because of which the number of burst transfers decreases. This reduction in the number of burst transfers leads to an overall reduction in the delay time preceding data output from the memory at the start of burst transfer and in pre-charge times after data output. On the other hand, however, the data transferring unit occupies the bus and memory for a longer period, causing deterioration of the processor transfer capability.

The calculated sum of the transfer capability of the processor and the transfer capability of the data transferring unit, therefore, has a maximum value, as depicted in FIG. 6. When the sum is at the maximum, the transfer capability of the processor balances with the transfer capability of the data transferring unit. For this reason, the lower limit burst width determining unit 15 may determine the burst width at which the sum of the transfer capability of the processor and the transfer capability of the data transferring unit is the maximum, to be the lower limit of the burst width. The lower limit determined by the lower limit burst width determining unit 15 is recorded in the actual machine 16, which is a product.

FIG. 7 is a flowchart of a method of determining the lower limit for the burst width. As depicted in FIG. 7, the designer first creates the measuring program 13, using the design device 11 (step S11). The designer then executes the measuring program 13 on the actual machine (or simulator) 12 (step S12). As a result, the design device 11 acquires the measurement data 14 as a measurement result, from the actual machine (or simulator) 12 (step S13). Subsequently, the lower limit burst width determining unit 15 calculates the transfer capability of the processor and the transfer capability of the data transferring unit for each burst width (step S14).

The lower limit burst width determining unit 15 then calculates the sum of the transfer capability of the processor and the transfer capability of the data transferring unit, for example, for each burst width. The lower limit burst width determining unit 15 determines, for example, the burst width at which the sum of the transfer capabilities is the maximum, to be the lower limit of the burst width (step S15), ending the series of steps for determining the lower limit of the burst width.

Figure 8:
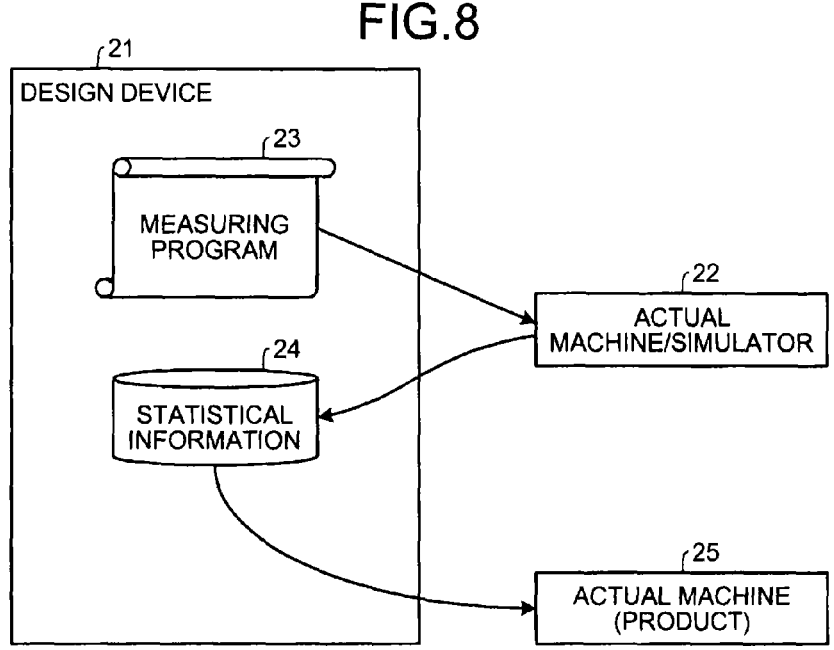
FIG. 8 is a block diagram of a configuration of a device that collects information concerning the time consumed for data processing by an image processing unit in the second embodiment.
Figure 9:
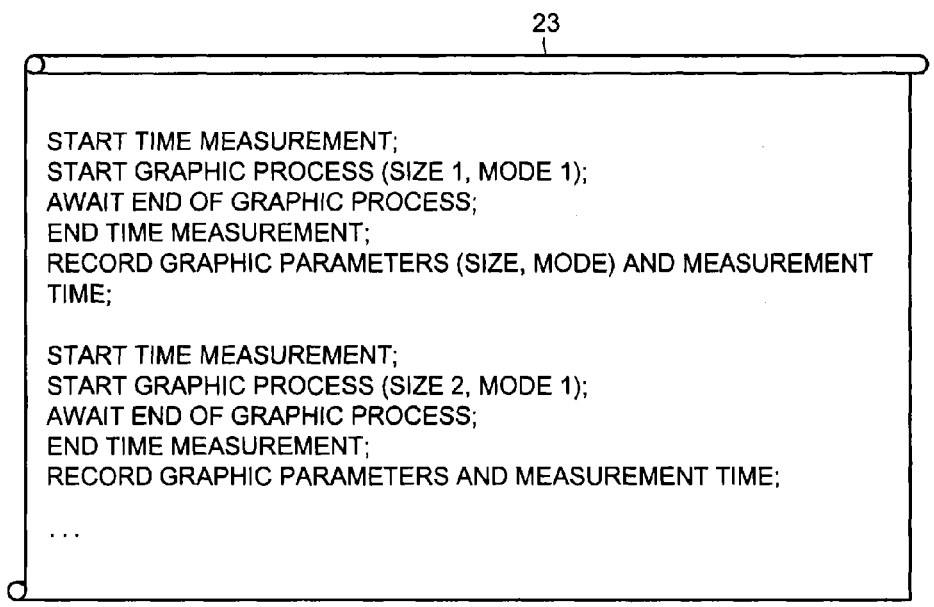
FIG. 9 depicts one example of a program for collecting information concerning the time consumed for data processing by the image processing unit in the second embodiment.
Figures 10, 11:
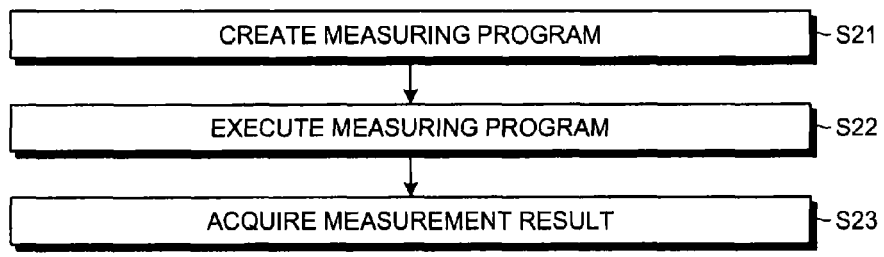
FIG. 10 is a graph depicting one example of a result of collection of information concerning the time consumed for data processing by the image processing unit in the second embodiment.
FIG. 11 is a flowchart of a method of collecting information concerning the time consumed for data processing by the image processing unit in the second embodiment.

Description of Method of Collecting Information Concerning Time Consumed for Data Processing by Image Processing Unit FIG. 8 is a block diagram of a configuration of a device that collects information concerning the time consumed for data processing by the image processing unit. FIG. 9 depicts one example of a program for collecting information concerning the time consumed for data processing by the image processing unit. FIG. 10 is a graph depicting one example of a result of collection of information concerning the time consumed for data processing by the image processing unit.

As depicted in FIG. 8, a design device 21 and an actual machine (or simulator) 22 are prepared. The actual machine (or simulator) 22 is the same as the machine (or simulator) described in "Description of Method of Determining Lower Limit of Burst Width" above. The measuring program 23 is created by the designer using the design device 21. As depicted in FIG. 9, the measuring program 23 is created as the program that causes the actual machine (or simulator) 22 to carry out graphic processes using combinations of various screen sizes (graphic sizes) and graphic modes. Graphic modes include, for example, a two-dimensional (2D) display mode and a three-dimensional (3D) display mode. The actual machine (or simulator) 22 executes the measuring program 23 to measure, via various combinations of screen size (graphic size) and graphic mode, the periods between the start and the end of the graphic processes carried out by the image processing unit. The actual machine (or simulator) 22 returns information of process times collected through the measurement as statistical information 24, to the design device 21.

As depicted in FIG. 10, the statistical information 24 includes statistically processed data indicating the time that the image processing unit consumes to carry out graphic processes for each combination of screen size (graphic size) and graphic mode. For example, the statistically processed data may be data indicating the average of time that the image processing unit has consumed to carry out multiple times, graphic processes for each combination of screen size (graphic size) and graphic mode. The statistical information 24 is recorded in the actual machine 25, which is a product. When information concerning the time that the image processing unit consumes to carry out the data processing can be acquired from design information of the image processing unit, the statistical information 24 may be acquired from the design information of the image processing unit.

FIG. 11 is a flowchart of a method of collecting information concerning the time consumed for data processing by the image processing unit. As depicted in FIG. 11, the designer first creates the measuring program 23, using the design device 21 (step S21). The designer then executes the measuring program 23 on the actual machine (or simulator) 22 (step S22). As a result, the design device 21 acquires the statistical information 24 as a measurement result from the actual machine (or simulator) 22 (step S23), ending the series of steps for collecting information concerning the time consumed for data processing by the image processing unit.

Description of Data Transferring Apparatus

Figure 12:
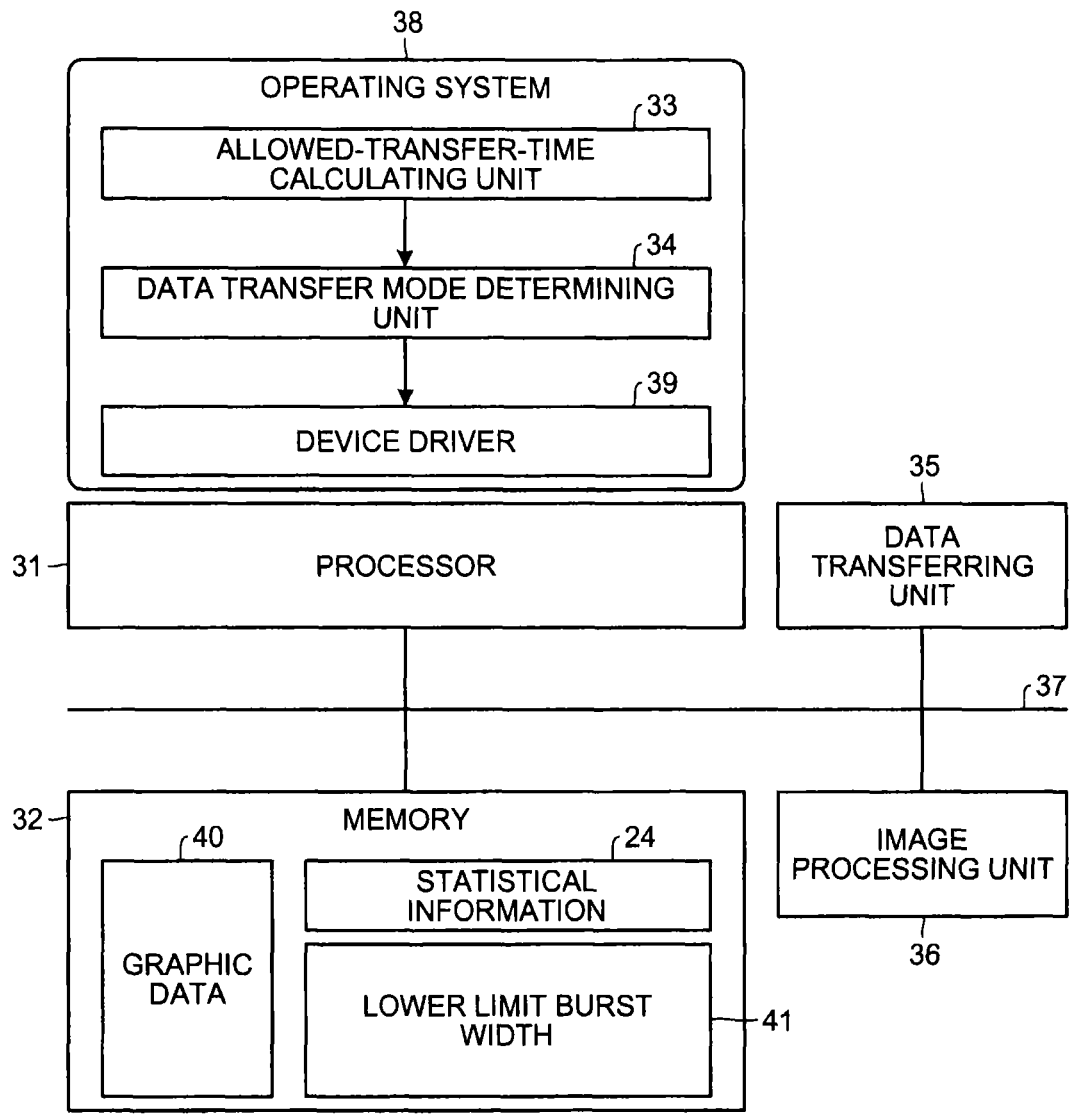
FIG. 12 is a block diagram of the data transferring apparatus of the second embodiment.

FIG. 12 is a block diagram of the data transferring apparatus according to the second embodiment. As depicted in FIG. 12, the data transferring apparatus includes a processor 31, memory 32 serving as the first, second, and third memory units, an allowed-transfer-time calculating unit 33 serving as the calculating unit, a data transfer mode determining unit 34 serving as the determining unit, a data transferring unit 35 serving as the transferring unit, and an image processing unit 36 serving as the processing unit. The processor 31, memory 32, data transferring unit 35, and image processing unit 36 are connected to a bus 37.

The processor 31 is, for example, a central processing unit (CPU), and executes an operating system (OS) 38. The processor 31 executes the operating system 38 to realize the allowed-transfer-time calculating unit 33, the data transfer mode determining unit 34, and a device driver 39. The device driver 39 controls the data transferring unit 35 and the image processing unit 36. The processor 31 executes application software that carries out image processing and image display, which are not depicted, and generates graphic data.

The memory 32 stores therein graphic data 40 generated by the processor 31. The memory 32 stores therein a lower limit burst width 41 described in "Description of Method of Determining Lower Limit of Burst Width" above. The memory 32 also stores therein the statistical information 24 described in "Description of Method of Collecting Information Concerning Time Consumed for Data Processing by Image Processing Unit" above. In the memory 32, an area storing the graphic data 40, an area storing the statistical information 24, and an area storing the lower limit burst width 41 correspond to the first memory unit, the second memory unit, and the third memory unit, respectively. The memory 32 may include readable/writable dynamic random access memory (DRAM) that stores the graphic data 40 and read-only memory (ROM) dedicated for data reading and storing the lower limit burst width 41 and the statistical information 24.

The allowed-transfer-time calculating unit 33 calculates the time that the data transferring unit 35 is allowed to consume for data transfer, based on the statistical information 24. Calculation of the allowable time will be described later. Based on the allowable time calculated by the allowed-transfer-time calculating unit 33, the data transfer mode determining unit 34 determines the mode (data transfer mode) that is to be adopted when the data transferring unit 35 transfers data. Multiple data transfer modes are prepared according to combinations of burst width and burst transfer interval. Determination of the data transfer mode will be described later. The data transferring unit 35 is, for example, a direct memory access (DMA) controller. In a data transfer mode determined by the data transfer mode determining unit 34, the data transferring unit 35 burst transfers the graphic data 40 from the memory 32 to the image processing unit 36.

The image processing unit 36 carries out a graphic process on graphic data transferred from the memory 32. The image processing unit 36 has (non-depicted) frame memory to which graphically expressed image data is stored. The image data stored in the frame memory is sent to a (non-depicted) display device, such as liquid crystal panel. For example, without limitation hereto, a cellular phone may be equipped with the data transferring apparatus of the second embodiment.

Description of Operation of Data Transferring Apparatus

Figure 13:
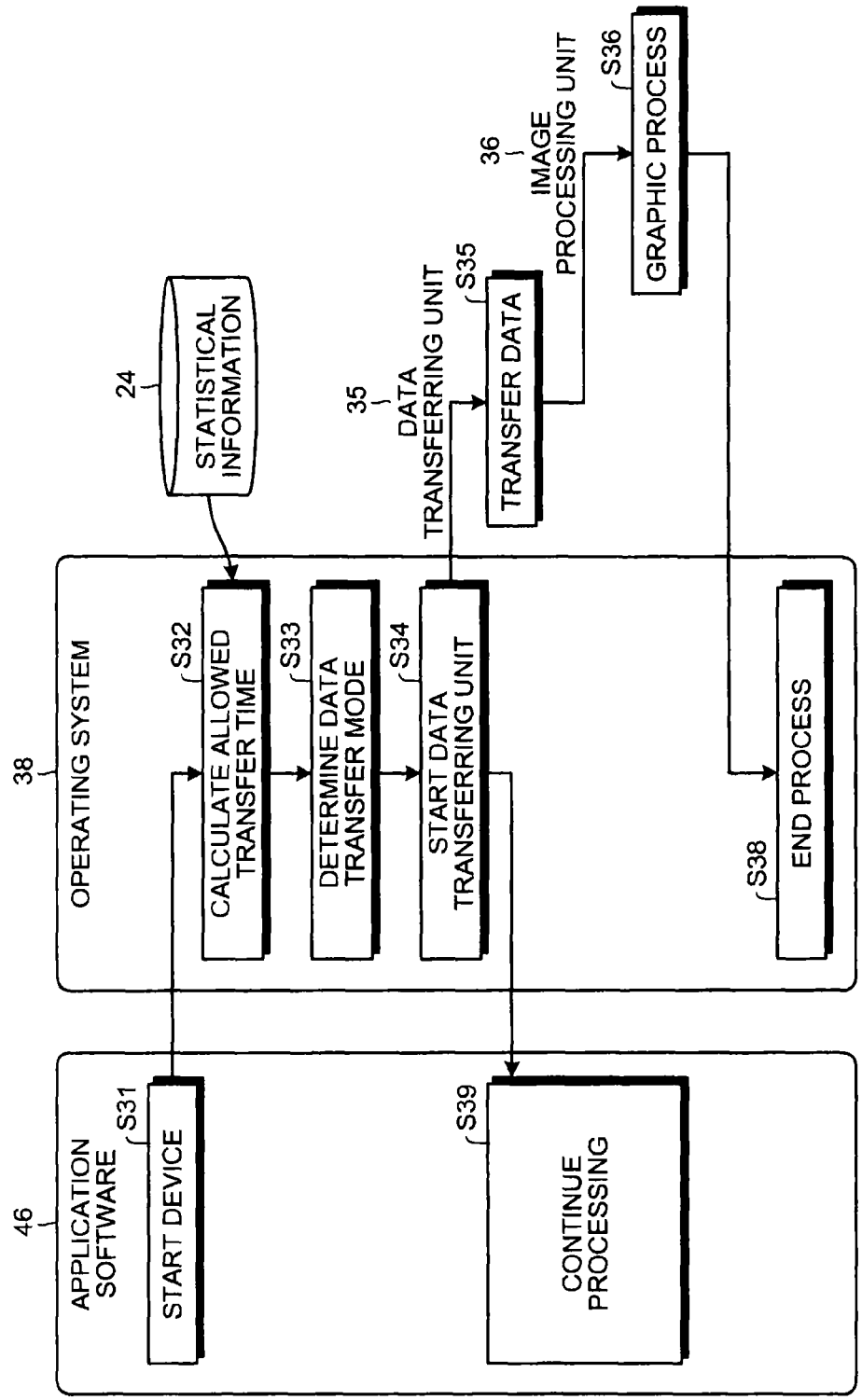
FIG. 13 is a sequence diagram of an operation of the data transferring apparatus of the second embodiment.

FIG. 13 is a sequence diagram of an operation of the data transferring apparatus according to the second embodiment. As depicted in FIG. 13, application software 46 instructs the operation system 38 to start a device, such as the image processing unit 36, when carrying out image processing or image display (step S31). Upon giving an instruction, the application software 46 delivers to the operating system 38, data that is to be transferred, startup parameters for the image processing unit 36, and a deadline for the completion of a process by the image processing unit 36. The startup parameters for the image processing unit 36 include parameters of screen size (graphic size), graphic mode, etc.

Subsequently, the operating system 38 causes the allowed-transfer-time calculating unit 33 to calculate the time (allowed transfer time) allowed for data transfer by the data transferring unit 35, based on the statistical information 24 (step S32). The operating system 38 then causes the data transfer mode determining unit 34 to determine the data transfer mode, based on the allowed transfer time (step S33). The operating system 38 then causes the device driver 39 to start the data transferring unit 35 (step S34).

Subsequently, the data transferring unit 35 burst transfers graphic data from the memory 32 to the image processing unit 36 by the data transfer mode determined at step S33 (step S35). The image processing unit 36 carries out a graphic process on the graphic data transferred thereto (step S36). Meanwhile, the application software 46 continues to execute processing (step S39). When the graphic process by the image processing unit 36 is over, the operating system 38 carries out an end process (step S38) to end the series of steps.

Method of Calculating Allowed Transfer Time

Figure 14:
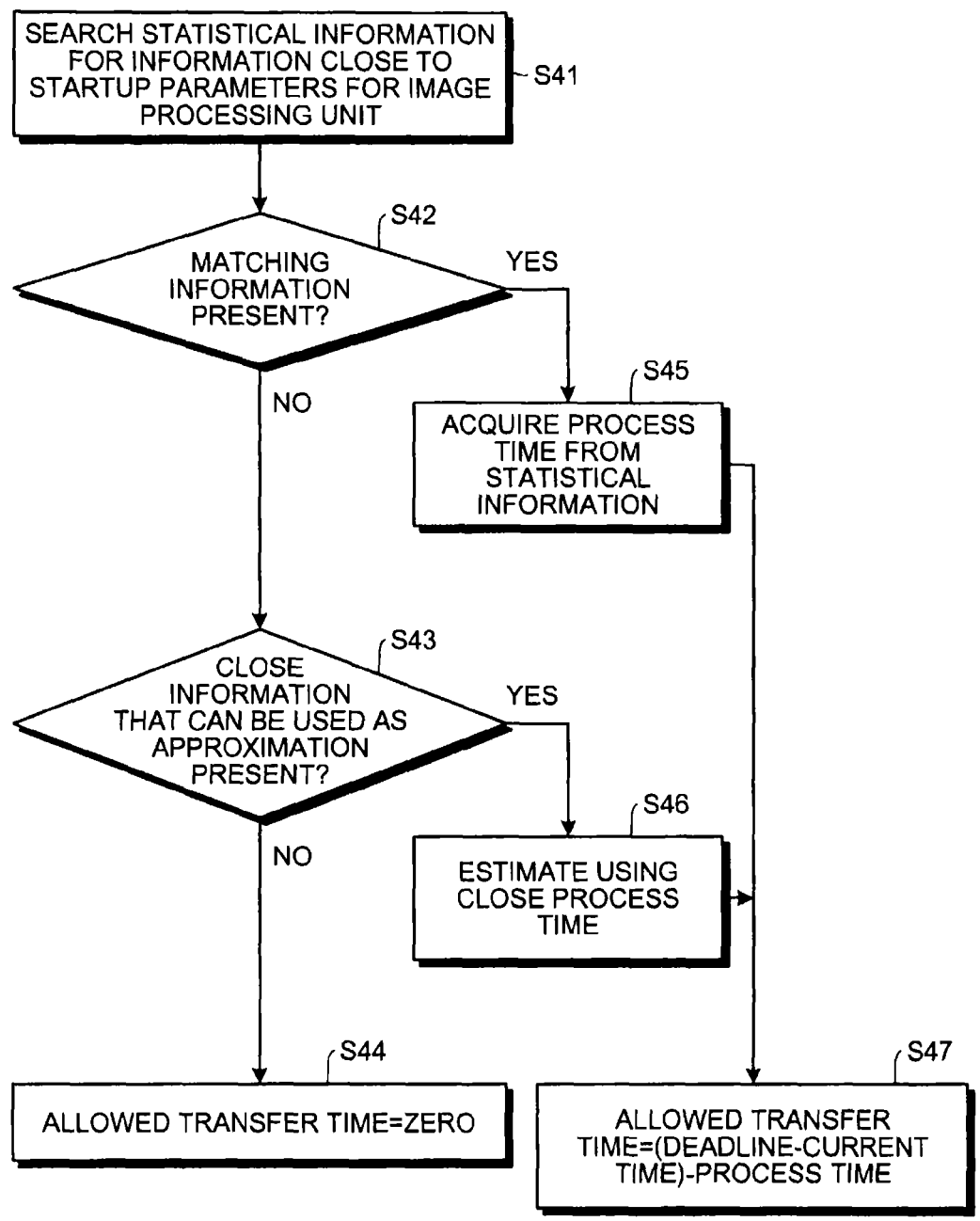
FIG. 14 is a flowchart of a method of calculating the allowed transfer time according to the data transferring method of the second embodiment.

FIG. 14 is a flowchart of a method of calculating the allowed transfer time according to the data transferring method of the second embodiment. As depicted in FIG. 14, the allowed-transfer-time calculating unit 33 first searches the statistical information 24 for information close to startup parameters for the image processing unit 36 (step S41). If information matching the startup parameters for the image processing unit 36 is included in the static information 24 (step S42: YES), the allowed-transfer-time calculating unit 33 acquires the process time corresponding to the information matching the startup parameters from the statistical information 24, as a process time for the image processing unit 36 (step S45).

If the statistical information 24 does not include information matching the startup parameters (step S42: NO), the statistical information 24 may include close information that can be used as an approximation to the startup parameters. If the statistical information 24 includes close information that can be used as an approximation (step S43: YES), the allowed-transfer-time calculating unit 33 acquires from the statistical information 24, the process time corresponding to the close information that can be used as an approximation. The allowed-transfer-time calculating unit 33 then estimates the process time for the image processing unit 36 by using the process time corresponding to the close information that can be used as an approximation, for example, by formulating a portion (portion changing in proportional to or inversely proportional to a specific parameter). For a portion that cannot be formulated, the allowed-transfer-time calculating unit 33 selects information indicating the maximum process time from information close to the startup parameters in terms of parameter combination, as an estimated value of the process time for the image processing unit 36 (step S46).

Having estimated the process time for the image processing unit 36 at step S45 or S46, the allowed-transfer-time calculating unit 33 calculates an allowed transfer time. The allowed transfer time is obtained by subtracting the process time for the image processing unit 36 from a period between the current time and the deadline for completion of the processing at the image processing unit 36 (step S47). The current time means, for example, the time at which the processor 31 has generated data to be transferred to the image processing unit 36. The deadline for completion of processing at the image processing unit 36 is determined depending on the interval of displaying images. For example, in a case of an apparatus that displays images 30 times per second, the interval of displaying images is ⅟30 second. In such a case, the deadline for completion of processing at the image processing unit 36 arrives every ⅟30 second.

If the statistical information 24 includes no information matching the startup parameters and no close information can be used as an approximation (step S43: NO), the allowed-transfer-time calculating unit 33 determines the allowed transfer time to be zero (step S44). Zero allowed transfer time means the immediate start of data transfer, that is, data transfer at the quickest timing.

Method of Determining Data Transfer Mode

Figure 15:
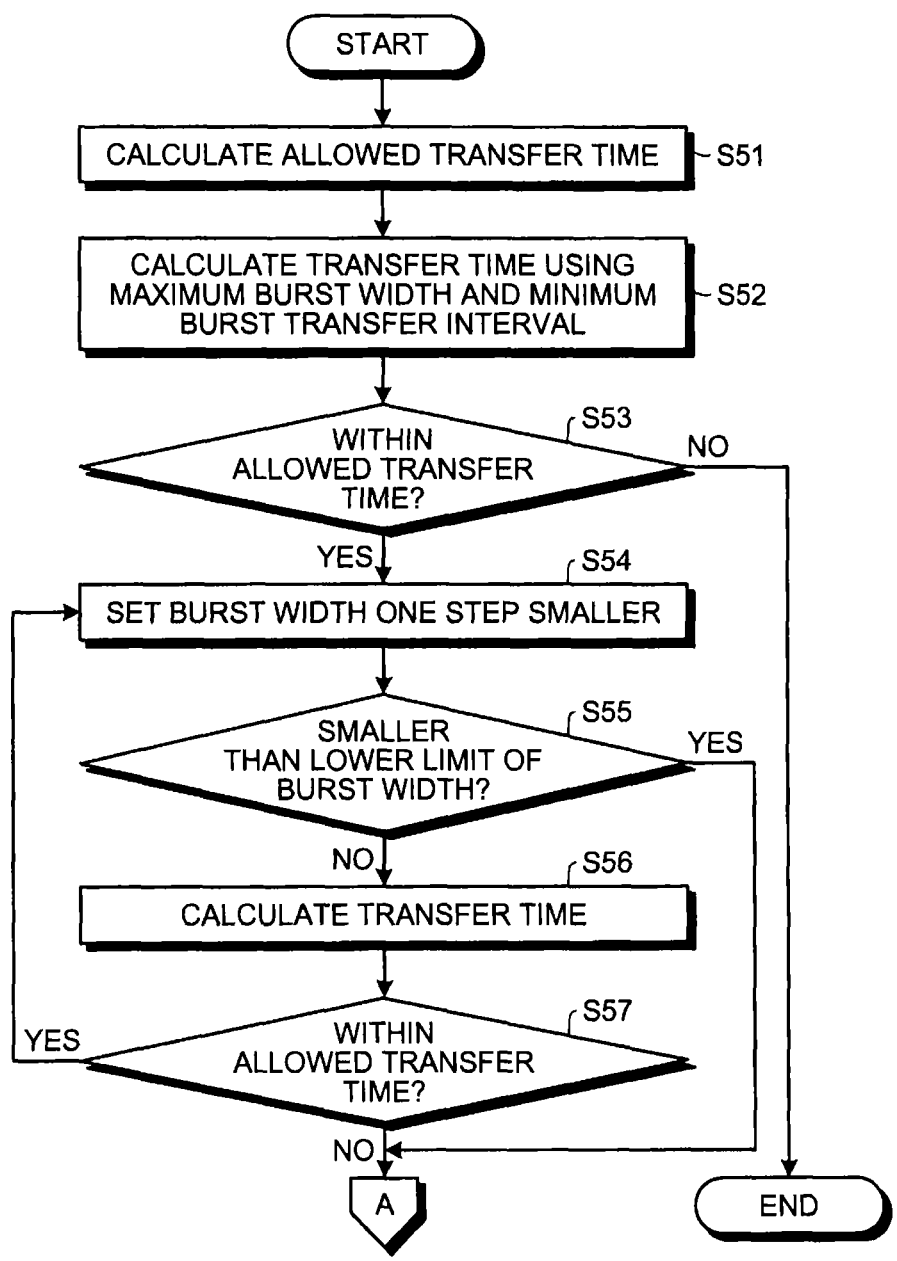
FIG. 15 is a flowchart of a method of determining a data transfer mode according to the data transferring method of the second embodiment.
Figure 16:
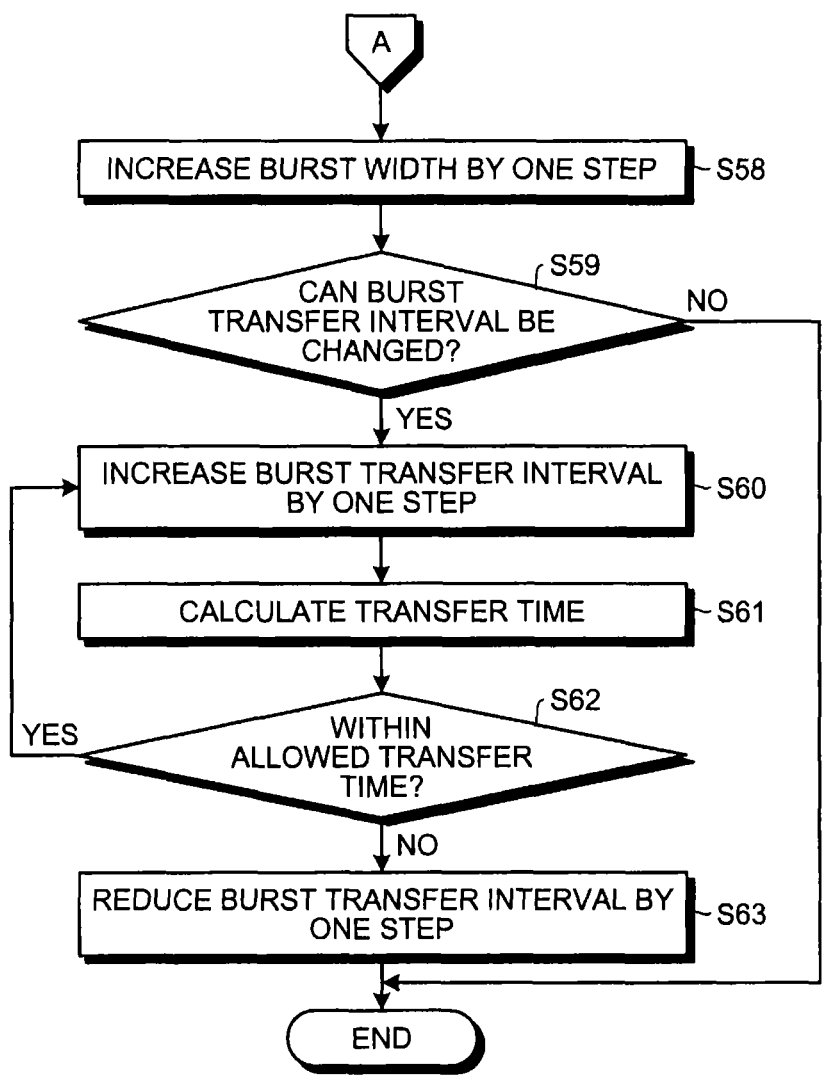
FIG. 16 depicts steps continued from the steps depicted in FIG. 15.
Figure 17:
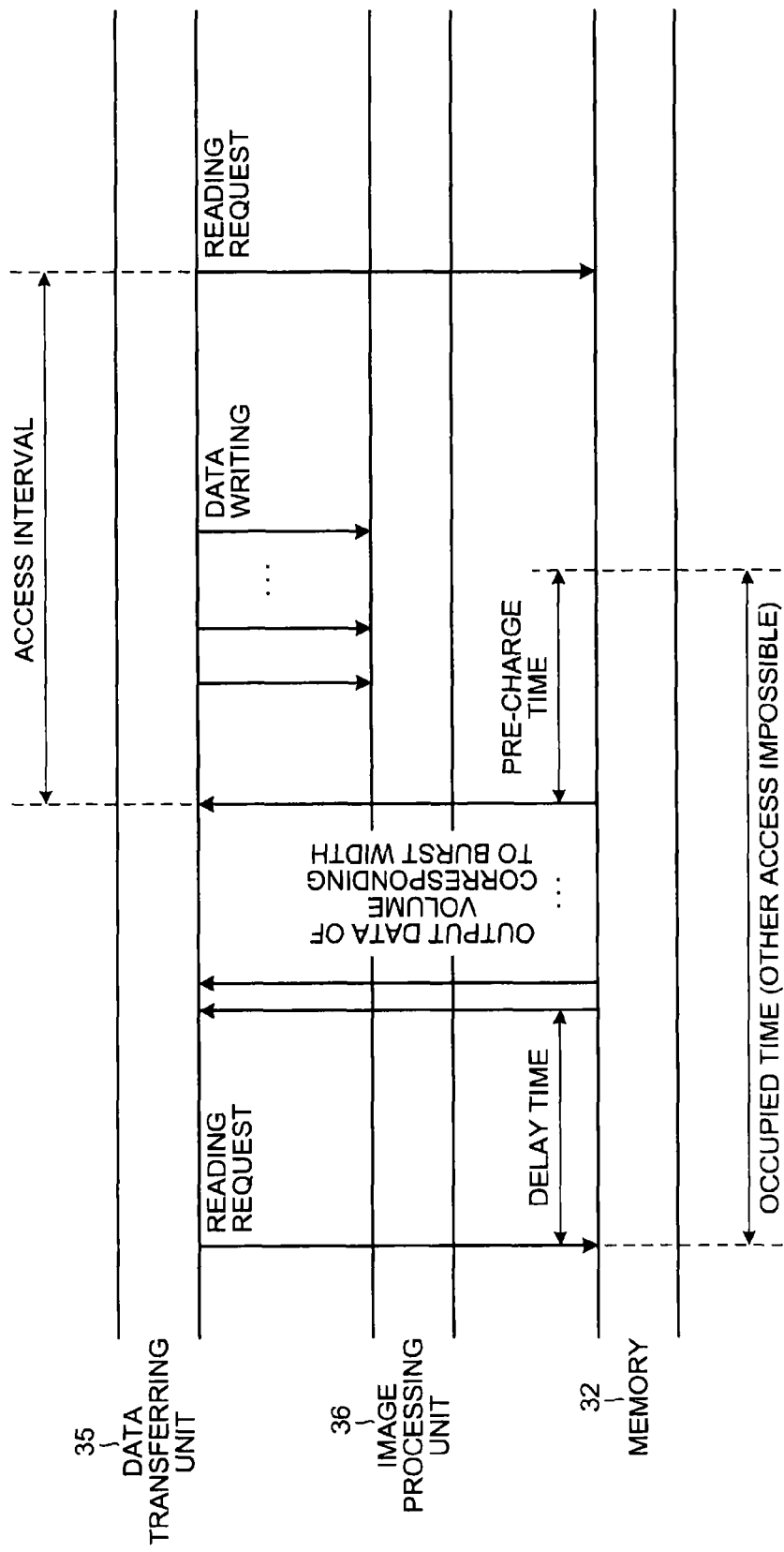
FIG. 17 is a chart for explaining a method of calculating the time for data transfer by the data transferring unit in the second embodiment.

FIG. 15 is a flowchart of a method of determining a data transfer mode according to the data transferring method of the second embodiment. FIG. 16 depicts steps continued from the steps depicted in FIG. 15. FIG. 17 is a chart for explaining a method of calculating the time for data transfer by the data transferring unit. As depicted in FIG. 15, when the allowed-transfer-time calculating unit 33 calculates an allowed transfer time in the manner described in "Method of Calculating Allowed Transfer Time" above (step S51), the data transfer mode determining unit 34 starts a process of determining the data transfer mode. The data transfer mode determining unit 34 first sets the burst width to the maximum width and the burst transfer interval to the minimum interval. Under this condition, the data transfer mode determining unit 34 calculates the time (transfer time) that the data transferring unit 35 consumes to transfer the graphic data 40 from the memory 32 to the image processing unit 36, using the following equation (step S52).

Transfer time=("delay time"+"output time for one data"×"burst width"+"x")×"number of transfers"

As depicted in FIG. 17, the delay time represents the period between the time at which the data transferring unit 35 creates a data reading request to the memory 32 by specifying a data address and the time at which data is actually output from the memory 32. The output time for one data represents the time that the memory 32 consumes to output one data. x represents the larger among an access interval and a pre-charge time. The pre-charge time represents the time required for pre-charge. The delay time, output time for one data, and pre-charge time can be acquired as design information of the memory 32. The access interval represents the period between the time at which burst transfer ends and the time at which the data transferring unit 35 creates the next data writing/reading request to the memory 32. The access interval can be acquired as design information of the data transferring unit 35. The number of transfers represents a value obtained by dividing the volume of data to be transferred by the burst width.

If the transfer time calculated at step S52 is not within the allowed transfer time calculated at step S51 (step S53: NO), the data transfer mode determining unit 34 ends the process of determining the data transfer mode. In this case, for example, moving pictures are reproduced with some frames being dropped and consequently the displayed image is not smooth. If the transfer time calculated at step S52 is within the allowed transfer time calculated at step S51 (step S53: YES), the data transfer mode determining unit 34 sets the burst width one step smaller (step S54). If the burst width set one step smaller is not smaller than the lower limit of the burst width (step S55: NO), the data transfer mode determining unit 34 recalculates a transfer time under conditions of the burst width set one step smaller and the smallest burst transfer interval (step S56).

If the transfer time calculated at step S56 is within the allowed transfer time calculated at step S51 (step S57: YES), the data transfer mode determining unit 34 repeats steps S54 to S57 while reducing the burst width by one step. In the course of repeating these operations, the burst width becomes smaller than the lower limit of the burst width (step S55: YES) or the transfer time exceeds the allowed transfer time (step S57: NO). In such a case, as depicted in FIG. 16, the data transfer mode determining unit 34 sets the burst width one step larger than the burst width at step S55: YES or step S57: NO (step S58).

If the burst transfer interval cannot be changed (step S59: NO), the data transfer mode determining unit 34 ends the process of determining the burst transfer mode. If the burst transfer interval can be changed (step S59: YES), the data transfer mode determining unit 34 sets the burst transfer interval one step larger (step S60). The data transfer mode determining unit 34 recalculates the transfer time under conditions of the burst width set at step S58 and the burst transfer interval set at step S60 (step S61).

If the transfer time calculated at step S61 is within the allowed transfer time calculated at step S51 (step S62: YES), the data transfer mode determining unit 34 repeats steps S60 to S62 while increasing the burst transfer interval by one step. In the course of repeating steps, if the transfer time falls outside the allowed transfer time (step S62: NO), the data transfer mode determining unit 34 reduces the burst transfer interval by one step (step S63). The data transfer mode determining unit 34 then ends the series of steps.

Method of Determining Data Transfer Mode in Case of Carrying Out Multiple Transfers When multiple data transferring units are present sharing the bus 37, contention of data transfer by the units may arise. In such a case, the burst width and the burst transfer interval are determined as described below.

Figure 18:
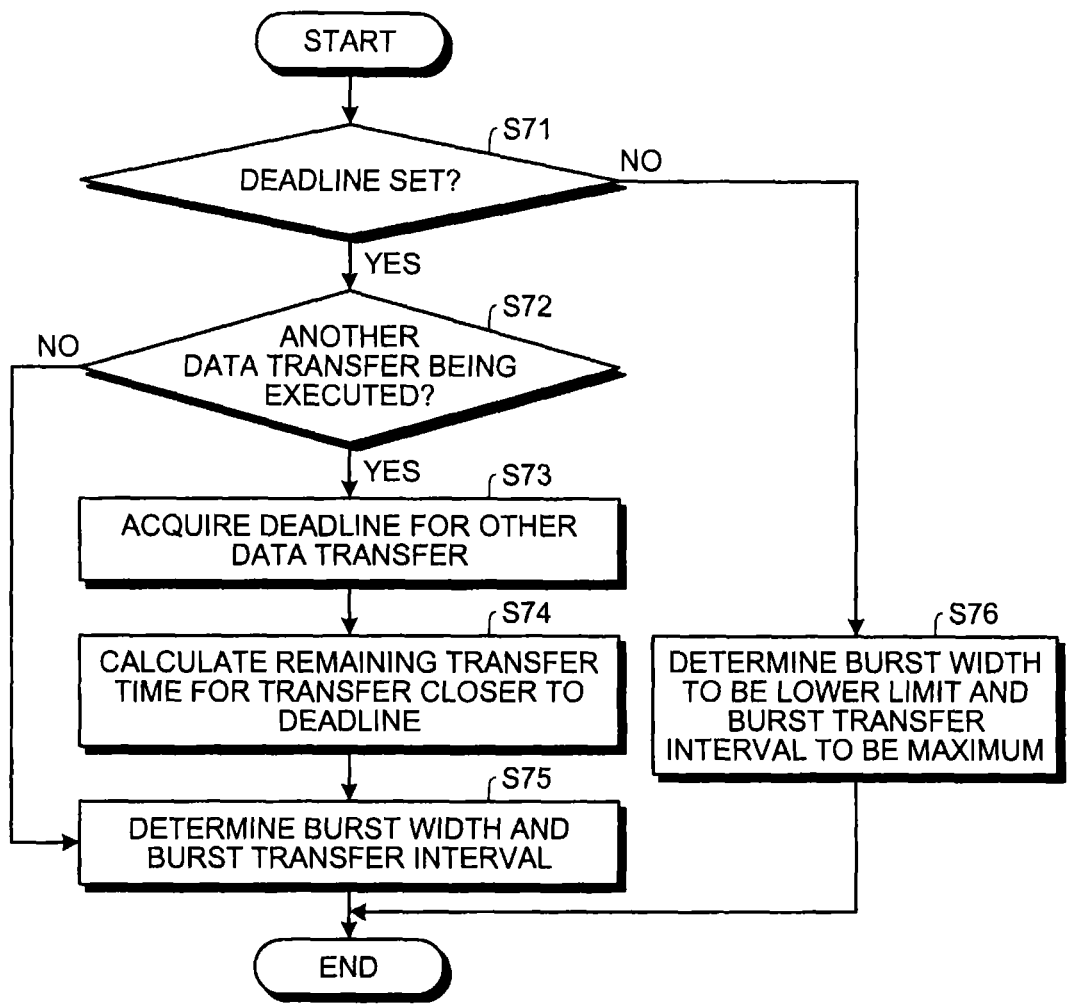
FIG. 18 is a flowchart of a method of determining the data transfer mode in a case of carrying out multiple transfers according to the data transferring method of the second embodiment.

FIG. 18 is a flowchart of a method of determining the data transfer mode in a case of carrying out multiple transfers according to the data transferring method of the second embodiment. When a time limit (deadline) is set for a data transfer that is about be started (step S71: YES) and another data transfer is being executed (step S72: YES), the data transfer mode determining unit 34 acquires the deadline for the other data transfer currently under execution (step S73).

The data transfer mode determining unit 34 then temporally sorts data transfers in order of priority such that a data transfer to be finished earlier is given higher priority. Hence, a data transfer without a deadline is given the lowest priority. For a data transfer higher in priority than the data transfer that is about to be started, that is, a data transfer closer to the deadline, the data transfer mode determining unit 34 acquires the volume of yet transferred data and a burst width and a burst transfer interval set by the data transferring unit. The data transfer mode determining unit 34 then calculates the remaining transfer time for the data transfer closer to the deadline, based on the volume of yet transferred data, the burst width, and the burst transfer interval (step S74).

The data transfer mode determining unit 34 then subtracts the remaining transfer time for the data transfer closer to the deadline calculate at step S74 from the allowed transfer time for the data transfer that is about to be started, and determines the difference to be the new allowed transfer time for the data transfer that is about to be started. The data transfer mode determining unit 34 determines the burst width and the burst transfer interval for the data transfer that is about to be started, based on the new allowed transfer time (step S75).

When a deadline is set for a data transfer that is about to be started (step S71: YES) and no other data transfer is executed (step S72: NO), the data transfer mode determining unit 34 determines the burst width and the burst transfer interval for the data transfer that is about to be started, in the manner as described in "Method of Determining Data Transfer Mode" above (step S75). When no deadline is set for the data transfer that is about to be started (step S71: NO), the data transfer mode determining unit 34 determines the burst width to be the lower limit of the burst width and the burst transfer interval to be the maximum burst transfer interval for the data transfer that is about to be started (step S76).

According to the second embodiment, the burst width is determined to be a value that is greater than or equal to the lower limit of the burst width and that is as close as possible to the lower limit of the burst width. A burst transfer interval is determined to be an interval as large as possible within a range in which data transfer is finished within a time allowed for the data transfer. In other words, the data transferring unit 35 carries out burst transfer so that the memory 32 and the bus 37 are released from an accessed condition as much as possible in a range in which data processing at the image processing unit 36 ends by a deadline for the data processing. Hence, deterioration of the effective capability of the processor can be prevented. The second embodiment applies not only to an apparatus and a method for processing images but also to an apparatus and a method for processing audio data and other data.

Third Embodiment

In a third embodiment, statistical information of the data transferring unit and the image processing unit is collected during the operation of the data transferring apparatus in the second embodiment. Based on statistical information of the data transferring unit collected during the operation of the data transferring apparatus, a transfer time for data transfer by the data transferring unit can be estimated. This method of estimating the transfer time may be applied to a case where, for example, estimating the transfer time based on the above transfer time equation results in a large error in the actual transfer time due to a certain cause, such as disturbance. Constituent elements different from those of the second embodiment will hereinafter be described. The constituent elements identical to those in the second embodiment are denoted by the same reference numerals used in the second embodiment and redundant description thereof is omitted.

Description of Data Transferring Apparatus

Figure 19:
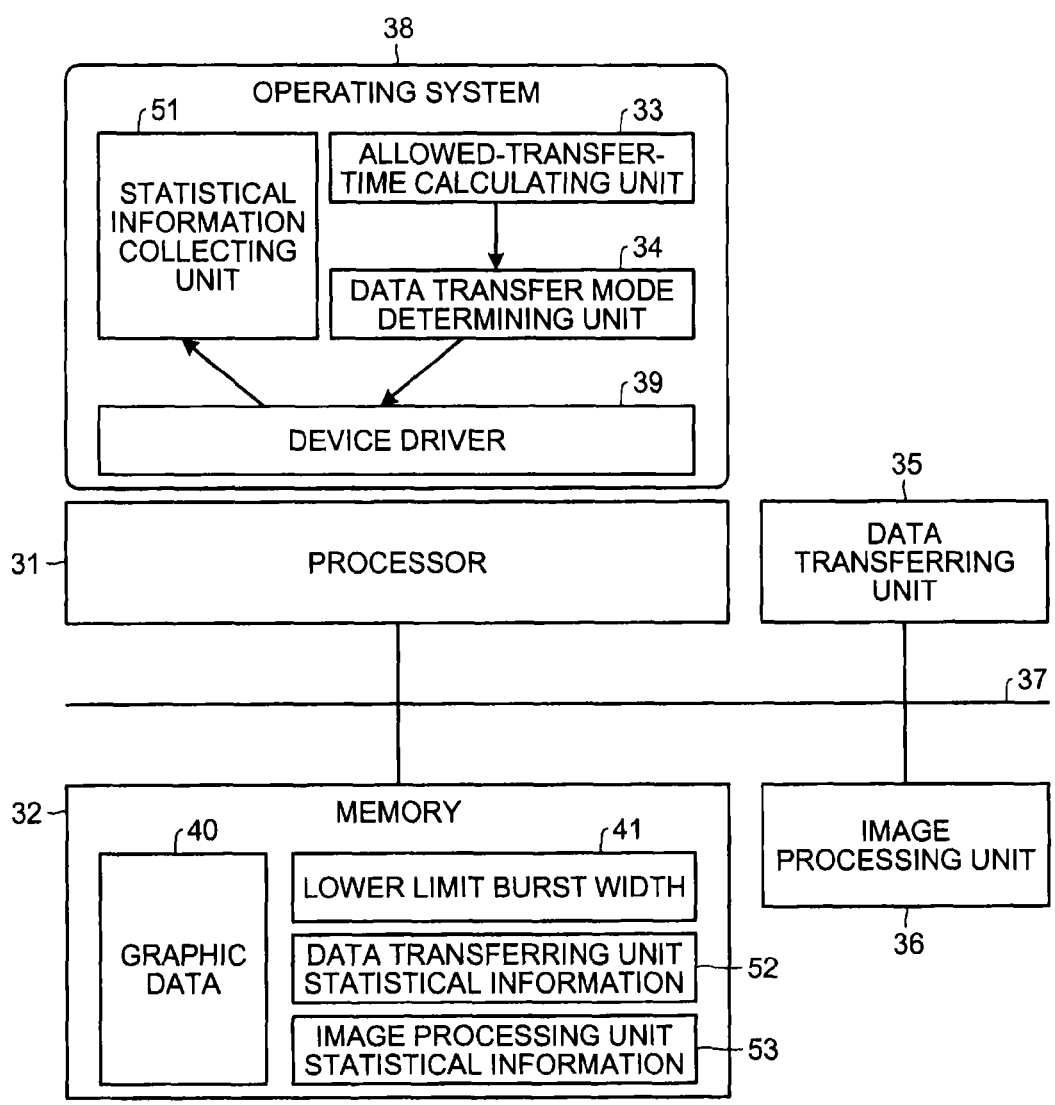
FIG. 19 is a block diagram of a data transferring apparatus of a third embodiment.

FIG. 19 is a block diagram of a data transferring apparatus of the third embodiment. As depicted in FIG. 19, the processor 31 executes the operating system 38 to realize a statistical information collecting unit 51. The statistical information collecting unit 51 collects operation information of the data transferring unit 35 and operation information of the image processing unit 36 from the device driver 39 during the operation of the data transferring apparatus and creates statistical information of the data transferring unit 35 and statistical information of the image processing unit 36. The operation of the statistical information collecting unit 51 will be described later. The device driver 39 records the operation information of the data transferring unit 35 and the operation information of the image processing unit 36 during the operation of the data transferring apparatus. The operation of the device driver 39 will be described later.

The memory 32 stores therein data transferring unit statistical information 52 and image processing unit statistical information 53. The data transferring unit statistical information 52 and image processing unit statistical information 53 are updated when necessary during the operation of the data transferring apparatus. In the memory 32, information of a process time acquired from the statistical information 24 and design information of the image processing unit 36 in the second embodiment are not stored. An allowed-transfer-time calculating unit 33 uses the image processing unit statistical information 53 when calculating the allowed transfer time that the data transferring unit 35 is allowed to consume for data transfer.

The data transfer mode determining unit 34 uses a lower limit burst width 41 and the data transferring unit statistical information 52 when determining a data transfer mode. When determining the data transfer mode, the data transfer mode determining unit 34 acquires the data transfer time for the data transferring unit 35 using the data transferring unit statistical information 52. Other constituent elements are identical to the constituent elements of the second embodiment. Instead of creating statistical information of the image processing unit 36 during the operation of the data transferring unit, statistical information acquired from design information of the image processing unit 36 or statistical information acquired from an actual machine or simulator may be used in the same manner as in the second embodiment.

Operation of Device Driver When Collecting Statistical information

Figure 20:
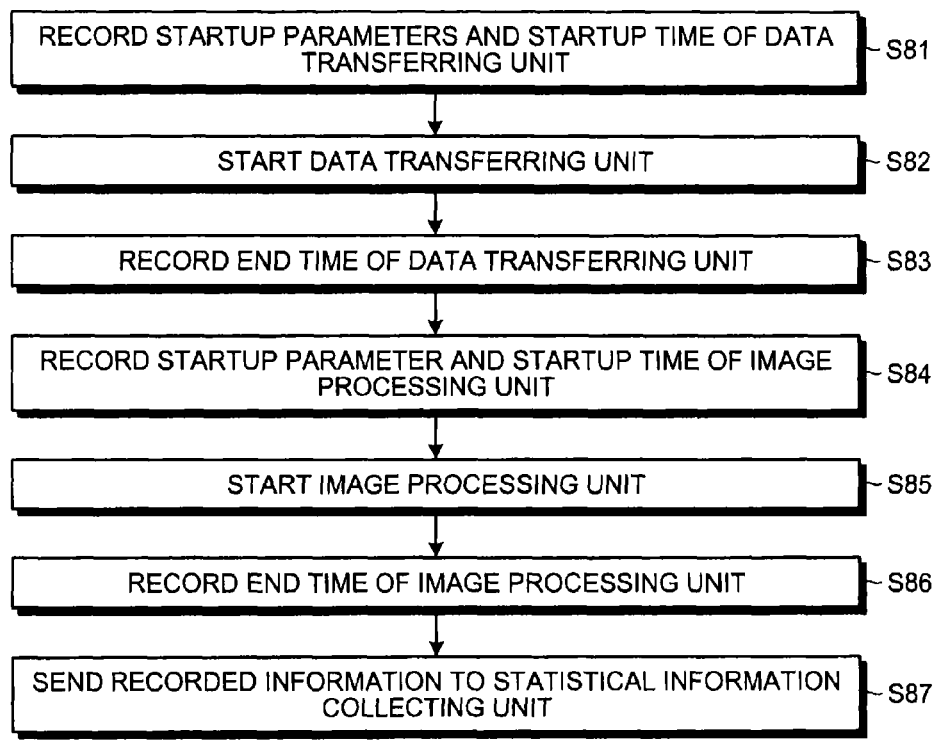
FIG. 20 is a flowchart of statistical information collecting operations carried out by a device driver in the third embodiment.

FIG. 20 is a flowchart of statistical information collecting operations carried out by the device driver. As depicted in FIG. 20, during the operation of the data transferring apparatus, the device driver 39 records data transferring startup parameters and the startup time of the data transferring unit 35 (step S81). The device driver 39 starts the data transferring unit 35 (step S82). When data transfer by the data transferring unit 35 is over, the device driver 39 records the time of the end of data transfer by the data transferring unit 35 (step S83).

When creating statistical information of the image processing unit 36, the device driver 39 records startup parameters and the startup time of the image processing unit 36 (step S84). The device driver 39 starts the image processing unit 36 (step S85). After the end of data processing by the image processing unit 36, when making statistical information of the image processing unit 36, the device driver 39 records the time of the end of data processing by the image processing unit 36 (step S86). The device driver 39 then sends the recorded information to the statistical information collecting unit 51 (step S87).

In the same manner as in the second embodiment, creating statistical information of the image processing unit 36 is unnecessary when statistical information acquired from design information of the image processing unit 36 or statistical information acquired in advance from the actual machine or simulator is used. If the statistical information of the image processing unit 36 is not created, steps S84 and S86 may be omitted.

Operation of Statistical information Collecting Unit

Figure 21:
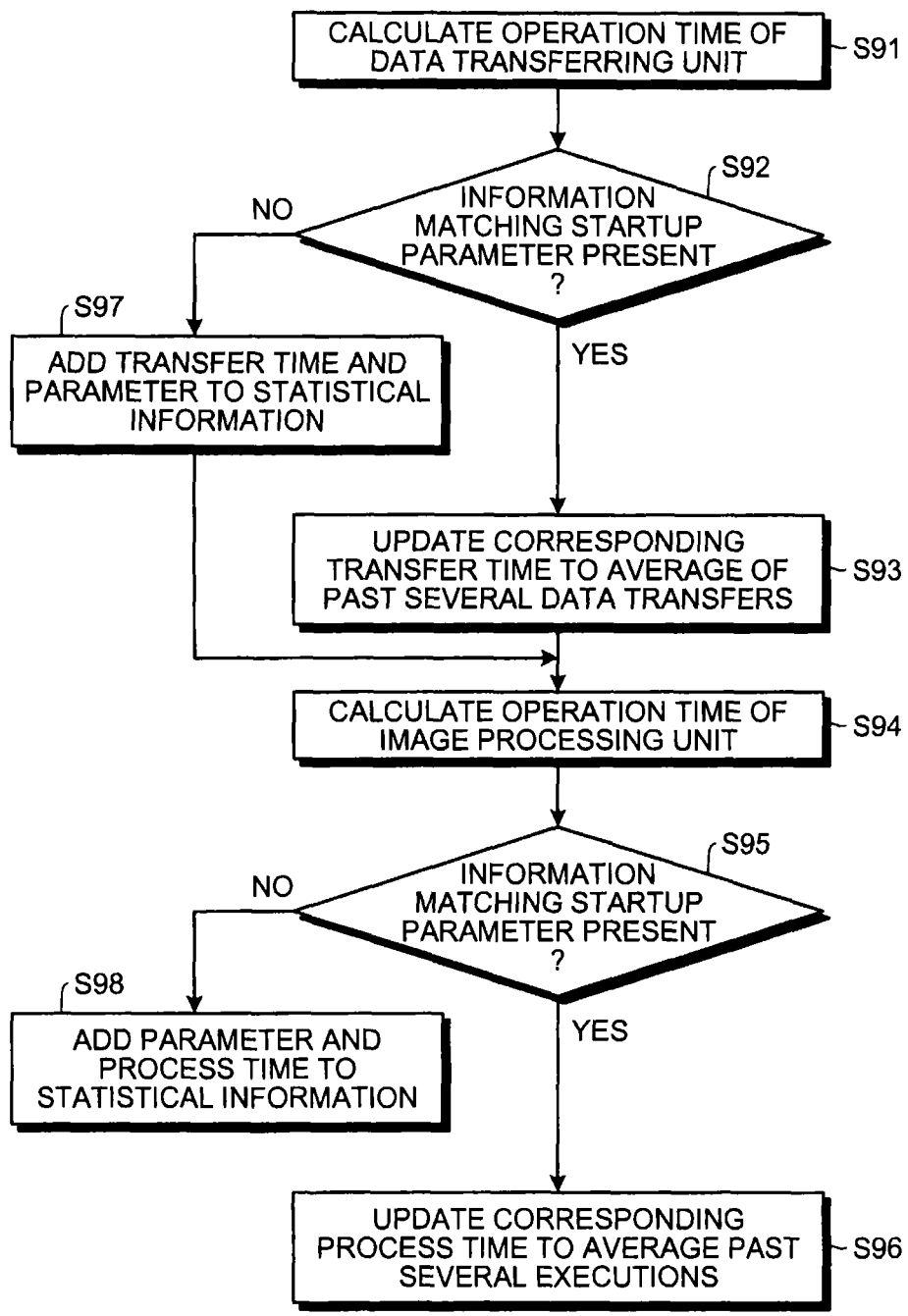
FIG. 21 is a flowchart of an operation of a statistical information collecting unit in the third embodiment.

FIG. 21 is a flowchart of an operation of the statistical information collecting unit. FIG. 22 is a table of an example of data transferring unit statistical information. As depicted in FIG. 21, the statistical information collecting unit 51 calculates the operation time of the data transferring unit 35 based on information sent from the device driver 39 (step S91). Subsequently, if the data transferring unit statistical information 52 at this time includes information matching a startup parameter (step S92:YES), the statistical information collecting unit 51 updates the transfer time of the data transferring unit statistical information 52 that corresponds to this parameter, to an average of the transfer times of the past several data transfers (step S93). If the data transferring unit statistical information 52 does not include information matching a startup parameter (step S92: NO), the statistical information collecting unit 51 correlates this parameter with a transfer time and adds the parameter to the data transferring unit statistical information 52 (step S97). As a result, for example, data of burst widths, burst transfer intervals, sizes of transferred data, and transfer times are acquired, as depicted in FIG. 22.

The statistical information collecting unit 51 then calculates the operation time of the image processing unit 36, based on information sent from the device driver 39 (step S94). Subsequently, if the image processing unit statistical information 53 at this time includes information matching a startup parameter (step S95: YES), the statistical information collecting unit 51 updates the process time of the image processing unit statistical information 53 that corresponds to this parameter, to an average of the process times of the past several executions of data processing (step S96). If the image processing unit statistical information 53 does not include information matching a startup parameter (step S95: NO), the statistical information collecting unit 51 correlates this parameter with a process time and adds the parameter to the image processing unit statistical information 53 (step S98).

Method of Calculating Data Transfer Time

FIG. 23 is a flowchart of a method of calculating the data transfer time according to the data transferring method of the third embodiment. As depicted in FIG. 23, the data transfer mode determining unit 34 first searches the data transferring unit statistical information 52 for information close to startup parameters of the data transferring unit 35 (step S101). If information matching the startup parameters for the data transferring unit 35 is included in the data transferring unit static information 52 (step S102:YES), the data transfer mode determining unit 34 acquires the transfer time corresponding to the information matching the startup parameters from the data transferring unit statistical information 52, as a transfer time for the data transferring unit 35 (step S105).

If the data transferring unit statistical information 52 does not include information matching the startup parameters (step S102: NO), the data transferring unit statistical information 52 may include close information that can be used as an approximation of the startup parameters. If the data transferring unit statistical information 52 includes close information that can be used as an approximation (step S103: YES), the data transfer mode determining unit 34 acquires from the data transferring unit statistical information 52, the transfer time corresponding to the close information that can be used as an approximation. The data transfer mode determining unit 34 then estimates a transfer time for the data transferring unit 35, using the transfer time corresponding to the close information that can be used as an approximation (step S106).

If the data transferring unit statistical information 52 includes no information matching the startup parameters and no close information that can be used as an approximation (step S103: NO), the data transfer mode determining unit 34 calculates the transfer time for the data transferring unit 35 based on design information of the memory 32 and design information of the bus 37 (step S104), as in the second embodiment. Configuration may be such that ratios between measured transfer times accumulated in the data transferring unit statistical information 52 and transfer times calculated based on the above transfer time equation are calculated to determine an average of the ratios for past several data transfers to be a correction factor. A corrected transfer time may be calculated by multiplying the transfer time calculated based on the transfer time equation by the correction factor.

The third embodiment offers effects identical to those of the second embodiment. For example, the third embodiment offers effects identical to those of the second embodiment offers even in a case when the transfer time cannot be estimated accurately by using the transfer time equation.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data transferring apparatus comprising:
a processor that generates data to be processed;
a first memory that stores the data generated by the processor;
a processing unit that processes the data generated by the processor;
a transferring unit that burst transfers the data from the first memory to the processing unit;
a second memory that stores information concerning time that the processing unit consumes to process the data;
a third memory that stores a prescribed value for a burst width set based on an access capability of the processor when accessing the first memory;
a calculating unit that calculates time that the transferring unit is allowed to consume for transfer of the data, based on the information that concerns the time that the processing unit consumes to process the data and is stored in the second memory; and a determining unit that based on an estimated time that the transferring unit is expected to consume for the transfer of the data, determines a burst width to be used for the transfer of the data by the transferring unit to be a value that is greater than or equal to the prescribed value for the burst width stored in the third memory and that is as close as possible to the prescribed value for the burst width, within a range in which the transfer of the data is finished within the time allowed for the transfer of the data calculated by the calculating unit, wherein the prescribed value for the burst width is a burst width at which a sum of the access capability of the processor when accessing the first memory and a capability of the transferring unit when burst transferring the data from the first memory becomes maximum, the burst width being calculated in advance in an environment in which the processor and the transferring unit access the first memory.

2. The data transferring apparatus according to claim 1, wherein the calculating unit calculates the time by subtracting from a period between start of the transfer of the data by the transferring unit and a deadline for completion of processing of the data at the processing unit, an estimated period that the processing unit is expected to consume to process the data, based on the information that concerns the time that the processing unit consumes to process the data and is stored in the second memory.

3. The data transferring apparatus according to claim 1, wherein the determining unit determines the burst width used for the transfer of the data by the transferring unit to be the prescribed value for the burst width and determines a burst transfer interval used at the transfer of the data by the transferring unit to be an interval as large as possible in a range in which the transfer of the data is finished within the time allowed for the transfer of the data.

4. The data transferring apparatus according to claim 1, wherein the calculating unit, when the transferring unit performs a plurality of data transfers arising in contention, sorts the data transfers in order of priority such that a data transfer with an earlier deadline for completion among the data transfers is given higher priority, and calculates the time by subtracting from a period between start of the transfer of the data by the transferring unit and a deadline for completion of the processing of the data at the processing unit, an estimated period that the processing unit is expected to consume to process the data, based on the information concerning the time that the processing unit consumes to process the data processing and remaining time to be consumed to complete the data transfer given higher priority.

5. The data transferring apparatus according to claim 1, wherein the determining unit estimates the time that the transferring unit consumes for the transfer of the data, based on design information of the first memory and volume of the data to be transferred.

6. The data transferring apparatus according to claim 1, wherein the determining unit estimates the time that the transferring unit consumes for the transfer of the data, based on an average of the time that the transferring unit has actually consumed for the transfer of data in the past.

7. A data transferring method executed by a transferring unit to burst transfer data generated by a processor, from a memory storing the data to a processing unit that processes the data, the method comprising:

setting a prescribed value for a burst width used at burst transfer by the transferring unit, based on an access capability of the processor when accessing the memory;

setting information concerning time that the processing unit consumes to process the data;

calculating time that the transferring unit is allowed to consume for transfer of the data, based on the information concerning the time that the processing unit consumes to process the data; and determining a value of the burst width to be used for the transfer of the data that is greater than or equal to the prescribed value for the burst width and that is as close as possible to the prescribed value for the burst width within a range in which the transfer of the data can be finished within the time allowed for the transfer of the data calculated, based on estimated time expected to be consumed for the transfer of the data, wherein the setting of the burst width includes determining the prescribed value for the burst width so that a sum of the access capability of the processor when accessing the memory and a capability of the transferring unit when burst transferring the data from the memory becomes maximum in an environment in which the processor and the transferring unit access the memory.

8. The data transferring method according to claim 7, wherein the calculating includes calculating the time by subtracting from a period between start of the transfer of the data and a deadline for completion of processing of the data at the processing unit, an estimated period that the processing unit is expected to consume to process the data, based on the information concerning the time that the processing unit consumes to process the data.

9. The data transferring method according to claim 7, wherein the determining includes determining the burst width used for the transfer of the data to be the prescribed value for the burst width and determining a burst transfer interval used at the transfer of the data to be an interval as large as possible in a range in which the transfer of the data is finished within the time allowed for the transfer of the data.

10. The data transferring method according to claim 7, wherein the calculating includes sorting, when a plurality of data transfers is performed arising in contention, the data transfers in order of priority such that a data transfer with an earlier deadline for completion among the data transfers is given higher priority, and calculating the time by subtracting from a period between start of the transfer of the data and a deadline for completion of the processing of the data at the processing unit, an estimated period that the processing unit is expected to consume to process the data, based on the information concerning the time that the processing unit consumes to process the data processing and remaining time to be consumed to complete the data transfer given higher priority.

11. The data transferring method according to claim 7, wherein the determining includes estimating the time consumed for the transfer of the data, based on design information of the memory and a volume of the data to be transferred.

12. The data transferring method according to claim 7, wherein the determining includes estimating the time consumed for the transfer of the data, based on an average of the time that has actually been consumed for the transfer of data in the past.

* * * * *